(12) United States Patent
Zhao

(10) Patent No.: US 10,216,392 B2
(45) Date of Patent: Feb. 26, 2019

(54) INFORMATION PROCESSING METHOD AND FIRST ELECTRONIC DEVICE FOR DETECTING SECOND ELECTRONIC DEVICE

(71) Applicants: Beijing Lenovo Software Ltd., Beijing (CN); Lenovo (Beijing) Co., Ltd., Beijing (CN)

(72) Inventor: Qian Zhao, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 303 days.

(21) Appl. No.: 14/518,386

(22) Filed: Oct. 20, 2014

(65) Prior Publication Data

US 2015/0268843 A1    Sep. 24, 2015

(30) Foreign Application Priority Data

Mar. 24, 2014    (CN) .......................... 2014 1 0112232

(51) Int. Cl.
| | | |
|---|---|---|
| *G06F 3/048* | (2013.01) | |
| *G06F 3/0484* | (2013.01) | |
| *H04W 4/02* | (2018.01) | |
| *H04W 4/20* | (2018.01) | |

(52) U.S. Cl.
CPC ...... *G06F 3/04847* (2013.01); *G06F 3/04842* (2013.01); *H04W 4/023* (2013.01); *H04W 4/20* (2013.01)

(58) Field of Classification Search
CPC ............ G06F 3/04847; G06F 3/04842; H04N 21/43615; H04N 21/43637; H04W 4/023; H04W 4/206; H04W 4/20
See application file for complete search history.

(56) References Cited

U.S. PATENT DOCUMENTS

| | | | |
|---|---|---|---|
| 2010/0178873 A1* | 7/2010 | Lee ..................... | H04M 1/7253 455/41.3 |
| 2010/0321312 A1* | 12/2010 | Han ...................... | G06F 1/1694 345/173 |
| 2011/0076941 A1* | 3/2011 | Taveau ................... | G06Q 10/10 455/41.1 |
| 2011/0163944 A1* | 7/2011 | Bilbrey .................. | G01D 21/02 345/156 |
| 2012/0244803 A1* | 9/2012 | Sudou ................. | H04M 1/7253 455/41.1 |
| 2013/0120520 A1* | 5/2013 | Eun .......................... | H04N 7/14 348/14.02 |

(Continued)

*Primary Examiner* — Kieu D Vu
*Assistant Examiner* — Asteway T Gattew
(74) *Attorney, Agent, or Firm* — Harness, Dickey & Pierce, P.L.C.

(57) ABSTRACT

An information processing method and a first electronic device are provided. The method includes: triggering a communication unit of a first electronic device to perform a detection; acquiring a second state parameter of a second electronic device, if the communication unit detects that a device distance between the first electronic device and the second electronic device meets a preset condition; and controlling a display unit of the electronic device to display a second icon in a first interface with a first manner. The second icon is for representing the second electronic device, and the first manner is determined based on the second state parameter.

4 Claims, 3 Drawing Sheets

(56) References Cited

U.S. PATENT DOCUMENTS

| | | | |
|---|---|---|---|
| 2013/0331130 A1* | 12/2013 | Lee | H04M 3/42348 455/457 |
| 2014/0123043 A1* | 5/2014 | Schmidt | G06F 3/04883 715/769 |
| 2014/0325371 A1* | 10/2014 | Wilson | G06F 3/0487 715/739 |
| 2015/0215770 A1* | 7/2015 | Chan | H04W 12/04 455/456.1 |

* cited by examiner

INFORMATION PROCESSING METHOD AND FIRST ELECTRONIC DEVICE FOR DETECTING SECOND ELECTRONIC DEVICE

CROSS REFERENCES OF RELATED APPLICATION

The present application claims the priority to Chinese Patent Application No. 201410112232.6, entitled "INFORMATION PROCESSING METHOD AND FIRST ELECTRONIC DEVICE", filed on Mar. 24, 2014 with the State Intellectual Property Office of People's Republic of China, which is incorporated herein by reference in its entirety.

FIELD

The present disclosure relates to the field of information processing technologies, and in particular, to an information processing method and a first electronic device.

BACKGROUND

With the development of the information processing technologies, information may be acquired by human in a variety of ways. For example, the information may be downloaded from the internet, or may be received with the radio. Furthermore, an electronic device may be employed to acquire information transmitted by other electronic devices.

For example, a first electronic device transmits information to a second electronic device. The first electronic device firstly needs to identify that the second electronic device is an electronic device with a demand for acquiring the information. According to a conventional solution, in the case that a device distance between the second electronic device and the first electronic device meets a preset condition, e.g., in the case that the device distance between the second electronic device and the first electronic device is within 10 m, the first electronic device searches for a device name of the second electronic device, and then determines, based on the device name, that the second electronic device is an electronic device with a demand for acquiring information.

However, the conventional solution at least has the following technical problems.

In the case that the first electronic device finds multiple second electronic devices having a same device name or having ambiguous device names, for example, device model numbers are taken as the device names, the first electronic device may fail to distinguish, among the multiple second electronic devices, the electronic device with the demand for acquiring information from electronic devices without the demand for acquiring information. Therefore, the first electronic device may have a difficulty to determine, among the multiple second electronic devices, the second electronic device to which the information should be transmitted, or the first electronic device may transmit the information to multiple second electronic devices, thereby causing unnecessary information transmission.

Accordingly, the conventional technical problem is that, when the first electronic device transmits information to the second electronic device, the first electronic device can not identify the second electronic device as the electronic device with the demand for acquiring information.

SUMMARY

An information processing method and a first electronic device are provided according to embodiments of the disclosure, to solve a conventional technical problem that, a first electronic device can not determine a second electronic device as an electronic device with a demand for acquiring information when the first electronic device transmits information to the second electronic device. With the provided information processing method and the provided first electronic device, the first electronic device may determine, when transmitting information to the second electronic device, the second electronic device as the electronic device with the demand for acquiring information based on a second state parameter, thereby improving the efficiency of the information transmission.

In one aspect, an information processing method is provided according to an embodiment of the disclosure. The method includes:

triggering a communication unit of a first electronic device to perform a detection;

acquiring a second state parameter of a second electronic device, if the communication unit detects that a device distance between the first electronic device and the second electronic device meets a preset condition; and controlling a display unit of the first electronic device to display a second icon in a first interface with a first manner, where the second icon is for representing the second electronic device, and the first manner is determined based on the second state parameter.

Optionally, acquiring the second state parameter of the second electronic device may include:

acquiring a relative position relationship between the second electronic device and the first electronic device.

Optionally, acquiring the relative position relationship between the second electronic device and the first electronic device may include:

acquiring at least one of a relative distance between the second electronic device and the first electronic device, and a relative angle of the second electronic device with respect to the first electronic device.

Optionally, when controlling the display unit of the first electronic device to display the second icon in the first interface with the first manner, the method may further include:

controlling the display unit to display a first icon representing the first electronic device in the first interface.

Optionally, in the case that the relative position relationship is the relative distance and the first icon is displayed in the first interface, controlling the display unit of the first electronic device to display the second icon in the first interface with the first manner may include:

determining a relative icon distance between the second icon and the first icon based on the relative distance; and controlling the display unit to display, in the first interface, the second icon at a circumference of a circle, where the relative icon distance is taken as a radius of the circle and the first icon is taken as a center of the circle.

Optionally, in the case that the relative position relationship is the relative angle and the first icon is displayed in the first interface, controlling the display unit of the first electronic device to display the second icon in the first interface with the first manner may include:

determining a relative icon angle of the second icon with respect to the first icon based on the relative angle; and controlling the display unit to display, in the first interface, the second icon at the relative icon angle with respect to the first icon.

Optionally, in the case that there are at least two second electronic devices, the relative position relationship comprises the relative distance and the relative angle, and the first icon is displayed in the first interface, controlling the display unit of the first electronic device to display the second icon in the first interface with the first manner may include:

determining relative positions of the respective second icons from the first icon based on the relative distances and the relative angles; and controlling the display unit to display, in the first interface, the respective second icons at the relative positions with respect to the first icon.

Optionally, acquiring the second state parameter of the second electronic device may include:

acquiring a motion state of the second electronic device through the detection of the communication unit.

Optionally, in the case that the second state parameter is the motion state, controlling the display unit of the first electronic device to display the second icon in the first interface with the first manner may include:

determining a motion display mode corresponding to the motion state based on the motion state; and controlling the display unit to display the second icon in the first interface with the motion display mode.

Optionally, determining the motion display mode corresponding to the motion state based on the motion state may include:

determining a first motion display mode corresponding to a first motion state as the motion display mode, if the communication unit detects that the motion state of the second electronic device is the first motion state; and determining that the motion display mode is switched from the first motion display mode to a second motion display mode corresponding to a second motion state, if the communication unit detects that the motion state of the second electronic device is switched from the first motion state to be the second motion state.

In another aspect, a first electronic device is provided according to an embodiment of the disclosure. The first electronic device includes a communication unit and a display unit. The first electronic device further includes:

a triggering unit, for triggering the communication unit to perform a detection;

an acquisition unit, for acquiring a second state parameter of a second electronic device, if the communication unit detects that a device distance between the second electronic device and the first electronic device meets a preset condition; and a control unit, for controlling the display unit to display a second icon n a first interface with a first manner, where the second icon is for representing the second electronic device, and the first manner is determined based on the second state parameter.

Optionally, the acquisition unit may be for acquiring a relative position relationship between the second electronic device and the first electronic device.

Optionally, the acquisition unit may be for acquiring at least one of a relative distance between the second electronic device and the first electronic device, and a relative angle of the second electronic device with respect to the first electronic device.

Optionally, the control unit may be further for controlling the display unit to display a first icon representing the first electronic device in the first interface, when the display unit is controlled to display the second icon in the first interface with the first manner.

Optionally, in the case that the relative position relationship is the relative distance, and the first icon is displayed in the first interface, the control unit may include:

a first determination sub-unit, for determining a relative icon distance between the second icon and the first icon based on the relative distance; and a first control sub-unit, for controlling the display unit to display, in the first interface, the second icon at a circumference of a circle, where the relative icon distance is taken as a radius of the circle and the first icon is taken as a center of the circle.

Optionally, in the case that the relative position relationship is the relative angle, and the first icon is displayed in the first interface, the control unit may include:

a second determination sub-unit, for determining a relative icon angle of the second icon with respect to the first icon based on the relative angle; and a second control sub-unit, for controlling the display unit to display, in the first interface, the second icon at the relative icon angle with respect to the first icon.

Optionally, in the case that there are at least two second electronic devices, the relative position relationship comprises the relative distance and the relative angle, and the first icon is displayed in the first interface, the control unit may include:

a third determination sub-unit, for determining relative positions of the respective second icons from the first icon based on the relative distances and the relative angles; and a third control sub-unit, for controlling the display unit to display, in the first interface, the respective second icons at the relative positions with respect to the first icon.

Optionally, the acquisition unit may be for acquiring a motion state of the second electronic device through the detection of the communication unit.

Optionally, in the case that the second state parameter is the motion state, the control unit may include:

a fourth determination sub-unit, for determining a motion display mode corresponding to the motion state based on the motion state; and a fourth control sub-unit, for controlling the display unit to display the second icon in the first interface with the motion display mode.

Optionally, the forth determination sub-unit may be for, determining a first motion display mode corresponding to a first motion state as the motion display mode, if the communication unit detects that the motion state of the second electronic device is the first motion state; and determining that the motion display mode is switched from the first motion display mode to a second motion display mode corresponding to a second motion state, if the communication unit detects that the motion state of the second electronic device is switched from the first motion state to be the second motion state.

A technical solution according to embodiments of the disclosure may have at least the following technical effects.

1. According to the embodiments of the disclosure, the communication unit of the first electronic device is triggered to perform the detection. In the case that the communication unit detects that the device distance between the first electronic device and the second electronic device meets the preset condition, the second state parameter of the second electronic device is acquired and the display unit is controlled to display the second icon in the first interface with the first manner. The second icon is for representing the second electronic device, and the first manner is determined based on the second state parameter.

Since the second state parameter of the second electronic device determines that the second icon representing the second electronic device is displayed in the first interface of the display unit of the first electronic device with the first manner, a conventional technical problem that the first electronic device cannot identify, when transmitting information to the second electronic device, the second electronic device as an electronic device with a demand for acquiring information. Therefore, when the first electronic device transmits information to the second electronic device, the first electronic device identifies, based on the second state parameter of the second electronic device, the second electronic device as the electronic device with the demand for acquiring information, and thus the efficiency of the information transmission may be improved.

2. According to the embodiments of the disclosure, the second state parameter of the second electronic device may be the relative position relationship between the second electronic device and the first electronic device, and particularly, may be the relative distance between the second electronic device and the first electronic device or the relative angle of the second electronic device with respect to the first electronic device. Hence, the first electronic device may identify, in a variety of ways, the second electronic device as the electronic device with the demand for acquiring information, and thus the efficiency of the information transmission may be improved.

3. According to the embodiments of the disclosure, since the second state parameter of the second electronic device may the relative position relationship between the second electronic device and the first electronic device, and particularly, may be the relative distance between the second electronic device and the first electronic device, and the relative angle of the second electronic device with respect to the first electronic device. If there are at least two second electronic devices, the relative positions of the second icons with respect to the first icon may be determined based on the relative distances and the relative angles, and then the display unit of the first electronic device is controlled to display, in the first interface, the second icons at the respective relative positions with respect to the first icon. The first icon is for representing the first electronic device, and the second icons are for representing the second electronic devices.

Therefore, if there are at least two second electronic devices, the first electronic device may distinguish among the second electronic devices based on the relative positions of the second electronic devices with respect to the first electronic device.

4. According to the embodiments of the disclosure, the second state parameter of the second electronic device may be the motion state of the second electronic device. The motion display mode corresponding to the motion state is determined based on the motion state. The display unit of the first electronic device is controlled to display the second icon in the first interface with the motion display mode. The second icon is for representing the second electronic device. Therefore, the first electronic device may determine, based on the motion state of the second electronic device, the second electronic device as the electronic device with the demand for acquiring information, and thus the efficiency of the information transmission may be improved.

BRIEF DESCRIPTION OF THE DRAWINGS

To more clearly explain technical solutions according to embodiments of the disclosure, drawings needed to be used in the description of the embodiments are briefly introduced hereinafter. Apparently, the drawings are merely exemplary, and other drawings may be obtained by the ordinary skilled in the art based on the provided drawings without creative work.

DETAILED DESCRIPTION

Figure 1:
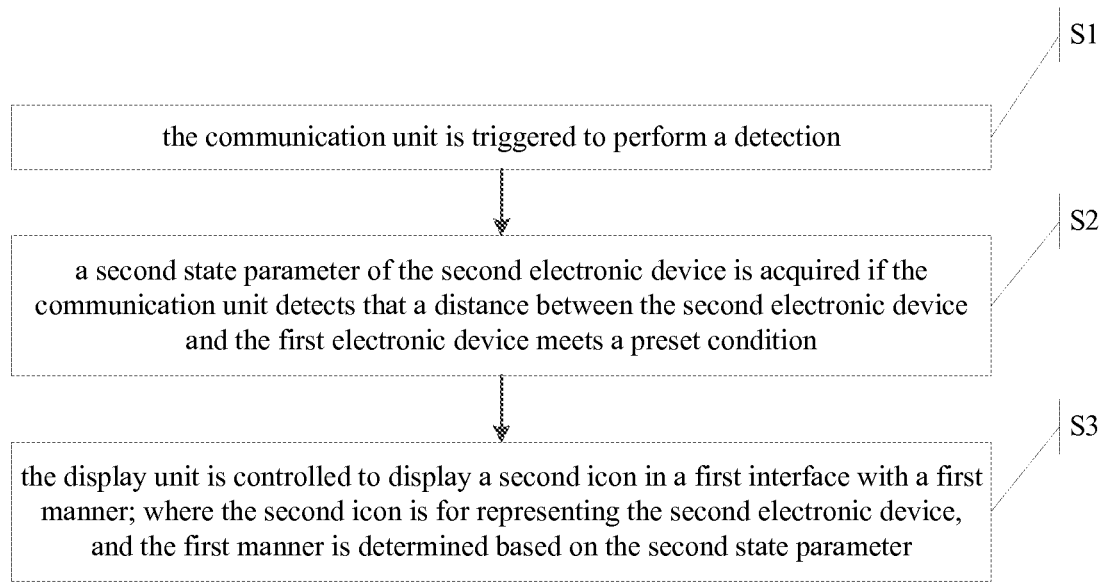
FIG. 1 is a flowchart of an information processing method according to a first embodiment of the disclosure.

An information processing method and a first electronic device are provided according to embodiments of the disclosure, to solve a conventional technical problem that, when a first electronic device transmits information to a second electronic device, the first electronic device can not identify the second electronic device as an electronic device with a demand for acquiring information. With the information processing method and the first electronic device provided in the disclosure, when the first electronic device transmits information to the second electronic device, the first electronic device may identify the second electronic device as the electronic device with the demand for acquiring information based on a second state parameter of the second electronic device, thereby improving the efficiency of information transmission.

A general conception of a technical solution according to the embodiments of the disclosure for solving the above technical problem is given as follows.

An information processing method is provided. The method includes: triggering a communication unit of a first electronic device to perform a detection; acquiring a second state parameter of a second electronic device in the case that the communication unit detects that a device distance between the first electronic device and the second electronic device meets a preset condition; and controlling a display unit of the first electronic device to display a second icon in a first interface with a first manner. The second icon is for representing the second electronic device, and the first manner is determined based on the second state parameter.

Since the second state parameter of the second electronic device determines that, the second icon representing the second electronic device is displayed in the first interface of the display unit of the first electronic device with the first manner, the conventional technical problem that the first electronic device can not identify the second electronic device as the electronic device with the demand for acquiring information when transmitting information to the second electronic device, is solved. Therefore, when the first electronic device transmits information to the second electronic device, the first electronic device may identify the second electronic device as the electronic device with the demand for acquiring information based on the second state parameter of the second electronic device, thereby improving the efficiency of the information transmission.

For better understanding of the technical solutions described above, the technical solutions are described in detail according to the embodiment in conjunction with the drawings. It should be noted that, particular features of the embodiments of the disclosure are intended to illustrate the technical solutions rather than to limit the disclosure. The embodiments of the disclosure may be combined with each other if the embodiments do not conflict with each other.

A First Embodiment

An information processing method is provided according to the embodiment of the disclosure, the method being applicable to a first electronic device. The first electronic device includes a communication unit and a display unit. In practice, the first electronic device may be a smart phone, a tablet computer, a notebook computer, a wearable device, etc. The communication unit may be a module which may communicate with other devices, such as a Bluetooth module, an infrared module, a WiFi module, a 3G module. The display unit may be a liquid crystal display, a touch display, a flexible display, etc. The first electronic device, the communication unit and the display unit are not limited thereto.

The information processing method according to the embodiment of disclosure is applicable in a process of acquiring, by a second electronic device, information transmitted by the first electronic device. The second electronic device may be a smart phone, a tablet computer, a notebook computer, a wearable device, etc., and the second electronic device is not limited thereto.

As shown in FIG. 1, the information processing method according to the embodiment of the disclosure includes the following steps S1-S3.

In the step S1, the communication unit is triggered to perform a detection.

In the step S2, a second state parameter of the second electronic device is acquired if the communication unit detects that a distance between the second electronic device and the first electronic device meets a preset condition.

In the step S3, the display unit is controlled to display a second icon in a first interface with a first manner; where the second icon is for representing the second electronic device, and the first manner is determined based on the second state parameter.

For example, the first electronic device is a first smart phone, the communication unit is a WiFi module, the display unit is a touch display and the second electronic device is a second smart phone. In this case, the step S1 of the information processing method according to the embodiment of the disclosure is described in detail as follows.

A first operation performed by a first user of the first electronic device is acquired. The first operation is for triggering the communication unit to perform a detection.

For example, the first user of the first smart phone performs a click operation on a sharing information application displayed in the touch display, and the WiFi module detects, in response to the click operation, whether there is an electronic device with a demand for acquiring information.

After the step S1, in which the detection is performed by the communication unit, is performed, the step S2 in the information processing method according to the embodiment of the disclosure is performed.

In practice, the step S2 includes the following sub steps:

determining whether the communication unit detects that the distance between the first electronic device and the second electronic device meets the preset condition, where the preset condition may be a preset distance range;

acquiring the second state parameter of the second electronic device if it is determined that the communication unit detects that the distance between the first electronic device and the second electronic device meets the preset condition; and performing the step S1 if it is determined that the communication unit detects that the distance between the first electronic device and second electronic device does not meet the preset condition.

Similarly, for example, the first electronic device is the first smart phone, the communication unit is the WiFi module, the display unit is the touch display, and the second electronic device is the second smart phone; in this case, the above sub steps are described in detail as follows.

After the step S1 is performed, i.e., after the detection is performed by the communication unit, it is determined whether the communication unit detects that the distance between the second smart phone and the first smart phone is within a detection range of the communication unit. For example, the WiFi module has a detection range from 0 m to 100 m, and it is determined whether the WiFi module detects that a distance between the second smart phone and the first smart phone is within a range from 0 m to 100 m.

If it is determined that the distance between the second smart phone and the first smart phone is 10 m, which is within the range from 0 to 100 m, the second state parameter of the second smart phone is acquired.

If it is determined that distance between the second smart phone and the first smart phone is 300 m, which is out of the range from 0 to 100 m, the click operation performed, by the first user of the first smart phone, on the sharing information application displayed in the touch display is acquired once more, and the WiFi module detects, in response to the click operation, that whether there is an electronic device with a demand for acquiring information.

According to the embodiment, in the step S2, the second state parameter of the second electronic device may be acquired with, for example, the following two acquiring approaches.

In a first acquiring approach, a relative position relationship between the second electronic device and the first electronic device is acquired. At least one of a relative distance between the second electronic device and the first electronic device and a relative angle of the second electronic device with respect to the first electronic device may be acquired.

In a second acquiring approach, the communication unit detects to acquire a motion state of the second electronic device.

Similarly, for example, the first electronic device is the first smart phone, the communication unit is the WiFi module, the display unit is the touch display and the second electronic device is the second smart phone; in this case, the above two acquiring approaches are described in detail as follows.

In the first acquiring approach, a relative position relationship between the second smart phone and the first smart phone is acquired. At least one of a relative distance between the second smart phone and the first smart phone and a relative angle of the second smart phone with respect to the first smart phone may be required. In practice, the relative position relationship between the second smart phone and the first smart phone may be acquired by a camera, an infrared recognition device, a projector, a GPS, etc.

Particularly, the first smart phone acquires a first position of the first smart phone and a second position of the second smart phone, and calculates to acquire the relative position relationship between the second smart phone and the first smart phone. The relative position relationship includes the relative distance between the second smart phone and the first smart phone and the relative angel of the second smart phone with respect to the first smart phone, i.e., a location of the second smart phone with respect to the first smart phone.

In the second acquiring approach, the motion state of the second smart phone is acquired through the WiFi module of the first smart phone. For example, the second smart phone may send a signal indicating that the second smart phone is shaken to the first smart phone, when the second smart phone is shaken by a second user of the second smart phone. Then the signal is received by the WiFi module of the first smart phone, thereby acquiring the motion state of the second smart phone.

Implementation of the step S3 varies with different acquiring approaches used to acquire the second state parameter of the second electronic device.

In the case that the second state parameter of the second electronic device is acquired with the first acquiring approach, the step S3 may be implemented with, for example, the following three implementation approaches.

In a first implementation approach, the display unit is controlled to display a first icon in the first interface in the case that the relative distance between the second electronic device and the first electronic device is acquired. The first icon is for representing the first electronic device. A relative icon distance between the second icon and the first icon is determined based on the relative distance between the second electronic device and the first electronic device. The display unit is controlled to display, in the first interface, the second icon at a circumference of a circle, where the relative icon distance is taken as the radius of the circle and the first icon is taken as the center of the circle.

In a second implementation approach, the display unit is controlled to display a first icon in the first interface in the case that the relative angle of the second electronic device with respect to the first electronic device is acquired. The first icon is for representing the first electronic device. A relative icon angle of the second icon with respect to the first icon is determined based on the relative angle of the second electronic device with respect to the first electronic device. The display unit is controlled to display, in the first interface, the second icon at a ray, where the first icon is taken as the initial point of the ray, and the ray forms an angle equal to the relative icon angle with a predetermined reference direction.

In a third implementation approach, there are at least two second electronic devices. The display unit is controlled to display a first icon in the first interface, in the case that the relative distance between each of the second electronic devices and the first electronic device and the relative angle of each of the second electronic devices with respect to the first electronic device are acquired. The first icon is for representing the first electronic device. Relative positions of the second icons with respect to the first icon are determined based on the relative distances and the relative angles. The display unit is controlled to display, in the first interface, the second icons at the respective relative positions with respect to the first icon.

Similarly, for example, the first electronic device is the first smart phone, the communication unit is the WiFi module, the display unit is the touch display, and the second electronic device is the second smart phone; in this case, the above three implementations approaches are described in detail as follows.

In the first implementation approach, in a case that an acquired relative distance between the second smart phone and the first smart phone is 10 m, the touch display is controlled to display the first icon in the first interface. The first icon is for representing the first smart phone. The relative icon distance of the second icon with respect to the first icon is determined as 1 cm based on the relative distance between the second smart phone and the first smart phone which is 10 m. The touch screen display is controlled to display, in the first interface, the second icon at the circumference of a circle, where the radius of the circle is 1 cm and the first icon is taken as the center of the circle. The second icon is for representing the second smart phone.

Figure 2:
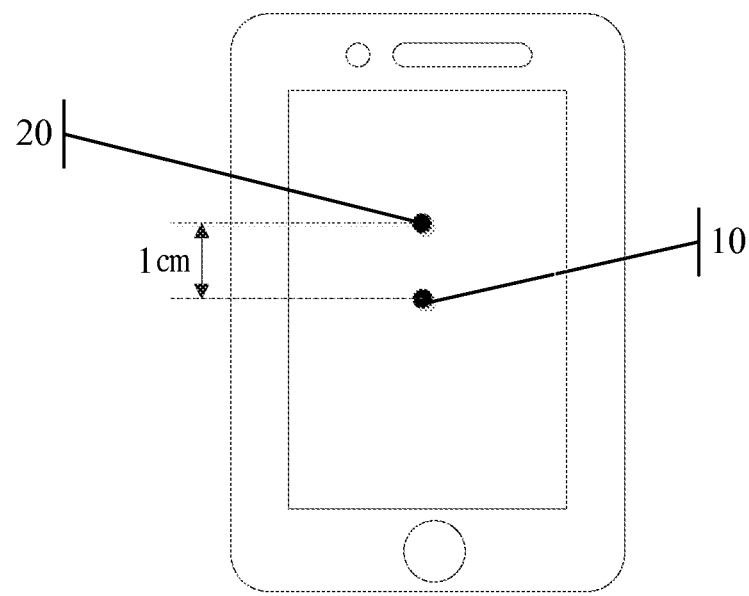
FIG. 2 is an illustrative diagram of a first interface according to the first embodiment of the disclosure, where a second state parameter of a second electronic device is acquired with a first acquiring approach, and a step S3 is performed with a first implementation approach.

As shown in FIG. 2, in the first interface of the touch display of the first smart phone, the second icon 20 is displayed at the circumference of a circle, where the radius of the circle is 1 cm and the first icon 10 is taken as the center of the circle. The first icon is configured to represent the first smart phone, and the second icon is configured to represent the second smart phone.

In the second implementation approach, in the case that the first smart phone is placed horizontally or substantially horizontally, and an acquired relative angle of the second smart phone with respect to the first smart phone is 30 degrees, the touch display is controlled to display the first icon in the first interface. The first icon is for representing the first smart phone. The relative icon angle of the second icon with respect to the first icon is determined as 30 degrees based on the acquired relative angle of 30 degrees. The touch display is controlled to display, in the first interface, the second icon at any position of a ray, where the first icon is taken as the initial point of the ray, and the ray forms an angle of 30 degrees with a reference direction of a reference ray, the reference ray being in parallel with two long edges of four edges of the touch display and pointing to an edge where a smart phone receiver is located. The second icon is for representing the second smart phone.

Figure 3:
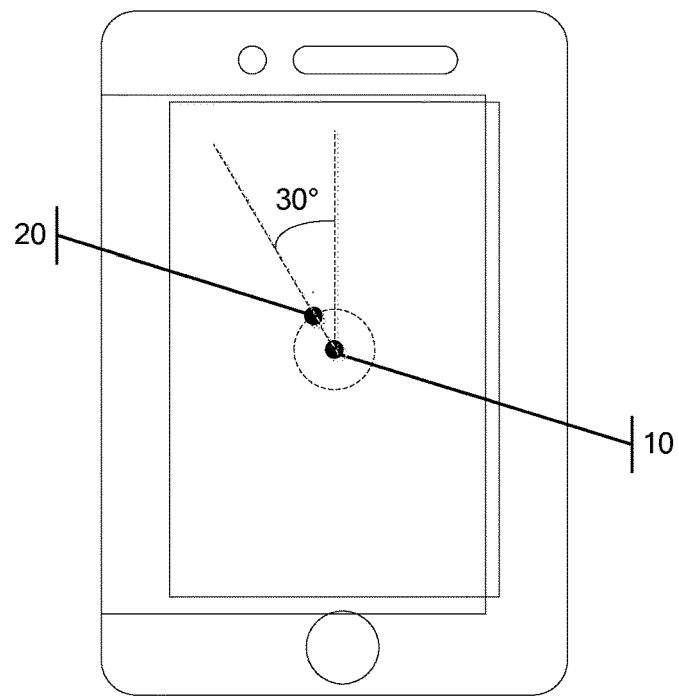
FIG. 3 is an illustrative diagram of the first interface according to the first embodiment of the disclosure, where the second state parameter of the second electronic device is acquired with the first acquiring approach, and the step S3 is performed with a second implementation approach.

As shown in FIG. 3, in the first interface of the touch display of the first smart phone, the second icon 20 is displayed at a ray, where the first icon 10 is taken as the initial point of the ray, and the ray anticlockwise forms an angle of 30 degrees with a reference direction of a reference ray, the reference ray being in parallel with two long edges of four edges of the touch display and pointing to an edge where the smart phone receiver is located. The first icon is for representing the first smart phone, and the second icon is for representing the second smart phone.

In the third implementation approach, the first smart phone is placed horizontally or substantially horizontally, and there are at least two second smart phones, e.g., a smart phone A and a smart phone B. In the case that an obtained relative distance from each of the smart phone A and the smart phone B to the first smart phone is 10 m, an obtained relative angle of the smart phone A with respect to the first smart phone is 30 degrees, and an obtained relative angle of the smart phone B with respect to the first smart phone is 60 degrees, the touch display is controlled to display the first icon in the first interface. The first icon is for representing the first smart phone. The relative icon distance between an icon A and the first icon is determined as 1 cm based on the acquired relative distance between the smart phone A and the first smart phone of 10 m, and the relative icon angle of the icon A with respect to the first icon is determined as 30 degrees based on the acquired relative angle of the smart phone A with respect to the first smart phone of 30 degrees. The relative icon distance between an icon B and the first icon is determined as 1 cm based on the acquired relative distance between the smart phone B and the first smart phone of 10 m, and the relative icon angle of the icon B with respect to the first icon is determined as 60 degrees based on the acquired relative angle of the smart phone B with respect to the first smart phone of 60 degrees. The touch display is controlled to display, in the first interface, the icon A at a first ray, where the first icon is taken as the initial point of the first ray, the first ray forms an angle of 30 degrees with a reference direction of a reference ray, the reference ray being in parallel with two long edges among four edges of the touch display and pointing to an edge where the smart phone receiver is located, and a distance between the icon A and the first icon is 1 cm. The touch display is controlled to display, in the first interface, the icon B at a second ray, where the first icon is taken as the initial point of the second ray, the second ray forms an angle of 60 degrees with the reference direction of the reference ray, and a distance between the icon B and the first icon is 1 cm. The icon A is for representing the smart phone A, and the icon B is for representing the smart phone B.

In the case that an obtained relative angle of the smart phone A with respect to the first smart phone and an obtained relative angle of the smart phone B with respect to the first smart phone are both 30 degrees, an obtained relative distance between the smart phone A and the first smart phone is 10 m, and an obtained relative distance between the smart phone B and the first smart phone is 20 m, the touch display is controlled to display the first icon representing the first smart phone is displayed in the first interface. The relative icon distance between an icon A and the first icon is determined as 1 cm based on the acquired relative distance between the smart phone A and the first smart phone of 10 m, and the relative icon angle of the icon A with respect to the first icon is determined as 30 degrees based on the acquired relative angle of the smart phone A with respect to the first smart phone of 30 degrees. The relative icon distance between an icon B and the first icon is determined as 2 cm based on the acquired relative distance between the smart phone B and the first smart phone of 20 m, and the relative icon angle of the icon B with respect to the first icon is determined as 30 degrees based on the acquired relative angle of the smart phone B with respect to the first smart phone of 30 degrees. The touch display is controlled to display, in the first interface, the icon A at a first ray, where the first icon is taken as the initial point of the first ray, the first ray forms an angle of 30 degrees with a reference direction of a reference ray, the reference ray being in parallel with two long edges among four edges of the touch display and pointing to an edge where the smart phone receiver is located, and a distance between the icon A and the first icon is 1 cm. The touch display is controlled to display, in the first interface, the icon B at the first ray, and a distance between the icon B and the first icon is 2 cm. The icon A is for representing the smart phone A, and the icon B is for representing the smart phone B.

In the case that an obtained relative angle of the smart phone A with respect to the first smart phone is 30 degrees, an obtained relative distance between the smart phone A and the first smart phone is 10 m, an obtained relative angle of the smart phone B with respect to the first smart phone is 60 degrees, and an obtained relative distance between the smart phone B and the first smart phone is 20 m, the touch display is controlled to display the first icon representing the first smart phone in the first interface. The relative icon distance between an icon A and the first icon is determined as 1 cm based on the acquired relative distance between the smart phone A and the first smart phone of 10 m, and the relative icon angle of the icon A with respect to the first icon is determined as 30 degrees based on the acquired relative angle of the smart phone A with respect to the first smart phone of 30 degrees. The relative icon distance between an icon B and the first icon is determined as 2 cm based on the acquired relative distance between the smart phone B and the first smart phone of 20 m, and the relative icon angle of the icon B with respect to the first icon is determined as 60 degrees based on the acquired relative angle of the smart phone B with respect to the first smart phone of 60 degrees. The touch display is controlled to display, in the first interface, the icon A at a first ray, where the first icon is taken as the initial point of the first ray, the first ray forms an angle of 30 degrees with a reference direction of a reference ray, the reference ray being in parallel with two long edges among four edges of the touch display and pointing to an edge where the smart phone receiver is located, and a distance between the icon A and the first icon is 1 cm. The touch display is controlled to display, in the first interface, the icon B at a second ray, where the first icon is taken as the initial point of the second ray, the second ray forms an angle of 60 degrees with the reference direction of the reference ray, and a distance between the icon B and the first icon is 2 cm. The icon A is for representing the smart phone A, and the icon B is for representing the smart phone B.

Figure 4:
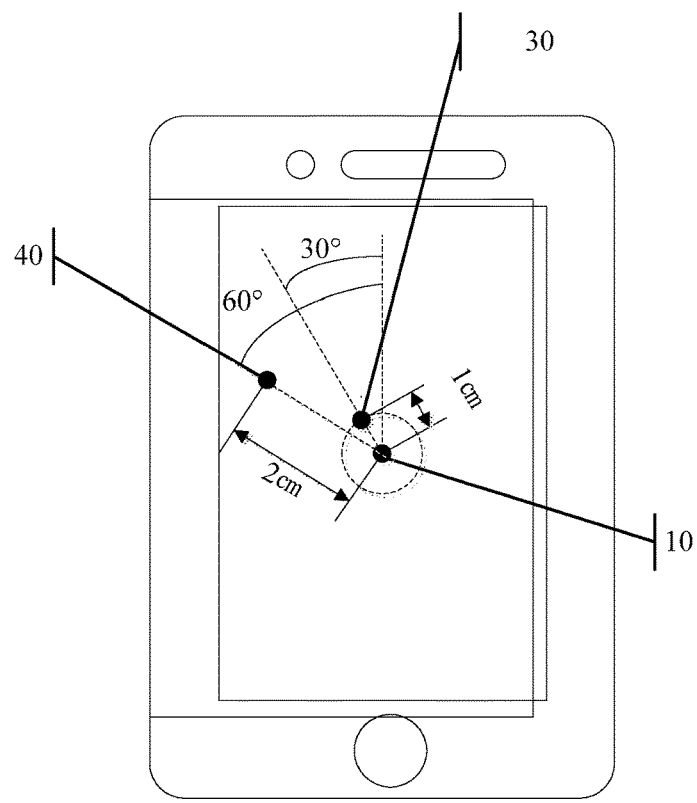
FIG. 4 is an illustrative diagram of the first interface according to the first embodiment of the disclosure, where the second state parameter of the second electronic device is acquired with the first acquiring approach, and the step S3 is performed with a third implementation approach.

As shown in FIG. 4, in the first interface of the touch display of the first smart phone, the icon A with numerical reference 30 is displayed at a first ray, where the first icon 10 is taken as the initial point of the first ray, the first ray anticlockwise forms an angle of 30 degrees with a reference direction of a reference ray, the reference ray being in parallel with two long edges among four edges of the touch display and pointing to an edge where the smart phone receiver is located, and a distance between the icon A and the first icon is 1 cm. The icon B with numerical reference 40 is displayed at a second ray, where the first icon 10 is taken as the initial point of the second ray, the second ray anticlockwise forms an angle of 60 degrees with the reference direction of the reference ray, and a distance between the icon B and the first icon is 2 cm. The first icon is for representing the first smart phone, the icon A is for representing the smart phone A, and the icon B is for representing the smart phone B.

In the case that the second state parameter of the second electronic device is acquired with the second acquiring approach, the step S3 may be implemented with the following sub steps.

In a first sub step, a motion display mode corresponding to the motion state is determined based on the motion state.

In a second sub step, the display unit is controlled to display the second icon in the first interface with the motion display mode.

According to the embodiment, the first sub step of determining the motion display mode corresponding to the motion state based on the motion state includes:

if the communication unit detects that the motion state of the second electronic device is a first motion state, determining a first display mode corresponding to the first motion state as the motion display mode; and if the communication unit detects that the second electronic device is switched from the first motion state to a second motion state, determining that the motion display mode is switched from the first motion display mode to a second motion display mode corresponding to the second motion state.

According to the embodiment, when the second sub step is performed, the display unit may be or may not be controlled to display the first icon in the first interface. The first icon is for representing the first electronic device.

That is, when the display unit is controlled to display the second icon in the first interface with the motion display mode, the first icon may be or may not be displayed in the first interface. The first icon is for representing the first electronic device.

Similarly, for example, the first electronic device is the first smart phone, the communication unit is the WiFi module, the display unit is the touch display and the second electronic device is the second smart phone; in this case, the first sub step and the second sub step are described in detail as follows.

If it is acquired that a second user of the second smart phone shakes the second smart phone, i.e., the second mart phone is in a shake state, a shake display mode corresponding to the shake state is determined, and the display unit is controlled to display the second icon in the first interface with the shake display mode. The second icon is for representing the second smart phone.

Figure 5:
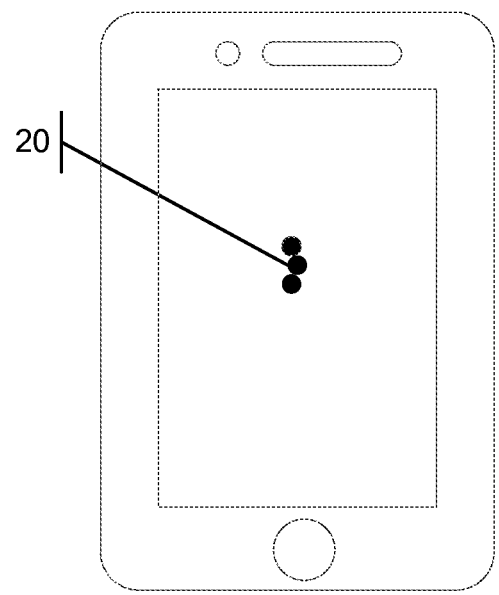
FIG. 5 is an illustrative diagram of the first interface according to the first embodiment of the disclosure, where the second state parameter of the second electronic device is acquired with a second acquiring approach.

As shown in FIG. 5, in the first interface of the touch display of the first smart phone, the second icon 20 for representing the second smart phone is displayed with the shake display mode.

If it is acquired that the second user of the second smart phone holds the second smart phone still instead of shake the second smart phone, i.e., the second smart phone is switched from the shake state to a static state, a static display mode corresponding to the static state is determined, and the motion display mode, with which the second icon representing the second smart phone is displayed in the first interface, is switched from the shake display mode to the static display mode.

In practice, all steps according to the embodiment, including the steps S1 to S3, may be implemented by an application software. For example, the first electronic device is the first smart phone, the communication unit is the WiFi module, the display unit is the touch display, and the second electronic device is the second smart phone. The application software is installed on both the first smart phone and the second smart phone. The first user of the first smart phone performs a click operation on the application software displayed in the touch display, the WiFi module detects, in response to the click operation, whether there is an electronic device with a demand for acquiring information. In the case that the WiFi module detects that a distance between the first smart phone and the second smart phone is 10 m, which is within a detection range of the WiFi module ranging from 0 m to 100 m, the relative distance between the second smart phone and the first smart phone, and the relative angle of the second smart phone with respect to the first smart phone are acquired. Then, on the touch display, the second icon representing the second smart phone is displayed at a ray, where the first icon representing the first smart phone is taken as the initial point of the ray, the ray forms an angle equal to the relative angle with a reference direction of a reference ray, the reference ray being in parallel with two long edges among four edges of the touch display and pointing to an edge where a receiver of the first smart phone is located, and a distance between the second icon and the first icon equals to the relative distance. Alternatively, the motion state of the second smart phone is acquired, and then the second icon is displayed with the motion display mode corresponding to the motion state.

A Second Embodiment

Based on the same conception as the above method, a first electronic device is further provided according to the embodiment of the disclosure. Since the principle of the solution of the first electronic device is similar to that of the information processing method, similar parts are not repeated.

Figure 6:
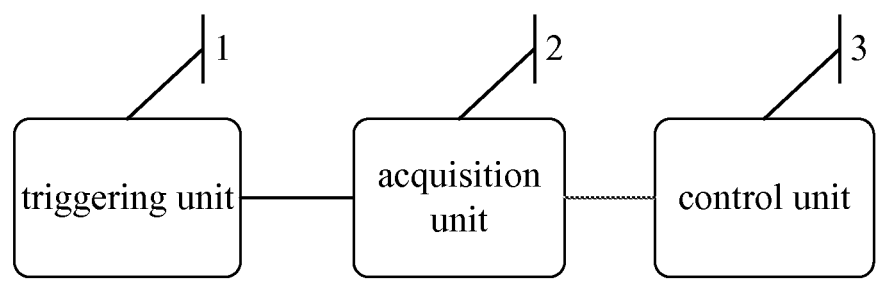
FIG. 6 is a block diagram of a first electronic device according to a second embodiment of the disclosure.

The first electronic device according to the embodiment of the disclosure includes a communication unit and a display unit. As shown in FIG. 6, the first electronic device further includes a triggering unit 1, an acquisition unit 2 and a control unit 3.

The triggering unit 1 is for triggering the communication unit to perform a detection.

The acquisition unit 2 is for acquiring a second state parameter of a second electronic device, in the case that the communication unit detects that a device distance between the second electronic device and the first electronic device meets a preset condition.

The control unit 3 is for controlling the display unit to display a second icon in a first interface with a first manner. The second icon is for representing the second electronic device, and the first manner is determined based on the second state parameter.

Optionally, the acquisition unit is for acquiring a relative position relationship between the second electronic device and the first electronic device.

Optionally, the acquisition unit is for acquiring at least one of a relative distance between the second electronic device and the first electronic device, and a relative angle of the second electronic device with respect to the first electronic device.

Optionally, the control unit is further for controlling the display unit to display a first icon representing the first electronic device in the first interface, when controlling the display unit to display the second icon in the first interface with the first manner.

Optionally, in the case that the relative position relationship is the relative distance, and the first icon is displayed in the first interface, the control unit includes:
a first determination sub-unit, for determining a relative icon distance between the second icon and the first icon based on the relative distance; and
a first control sub-unit, for controlling the display unit to display, in the first interface, the second icon at any position of the circumference of a circle, where the relative icon distance is taken as the radius of the circle and the first icon is taken as the center of the circle.

Optionally, in the case that the relative position relationship is the relative angle, and the first icon is displayed in the first interface, the control unit includes:
a second determination sub-unit, for determining a relative icon angle of the second icon with respect to the first icon based on the relative angle; and
a second control sub-unit, for controlling the display unit to display, in the first interface, the second icon at the relative icon angle with respect to the first icon.

Optionally, in the case that there are at least two second electronic devices, the relative position relationship includes the relative distance and the relative angle, and the first icon is displayed in the first interface, the control unit includes:

a third determination sub-unit, for determining relative positions of respective second icons from the first icon based on the relative distances and the relative angles; and a third control sub-unit, for controlling the display unit to display, in the first interface, the second icons at the respective relative positions with respect to the first icon.

Optionally, the acquisition unit is for acquiring a motion state of the second electronic device through the detection of the communication unit.

Optionally, in the case that the second state parameter is the motion state, the control unit includes:

a fourth determination sub-unit, for determining a motion display mode corresponding to the motion state based on the motion state; and a fourth control sub-unit, for controlling the display unit to display the second icon in the first interface with the motion display mode.

Optionally, the forth determination sub-unit is for:

determining a first motion display mode corresponding to a first motion state as the motion display mode, if the communication unit detects that the motion state of the second electronic device is the first motion state; and determining that the motion display mode is switched from the first motion display mode to a second motion display mode corresponding to a second motion state, if the communication unit detects that the motion state of the second electronic device is switched from the first motion state to the second motion state.

The technical solutions according to the embodiments of the disclosure may have at least the following effects.

1. According to the embodiments of the disclosure, the communication unit of the first electronic device is triggered to perform the detection. In the case that the communication unit detects that the device distance between the first electronic device and the second electronic device meets the preset condition, the second state parameter of the second electronic device is acquired and the display unit is controlled to display the second icon in the first interface with the first manner. The second icon is for representing the second electronic device, and the first manner is determined based on the second state parameter.

Since the second state parameter of the second electronic device determines that the second icon representing the second electronic device is displayed in the first interface of the display unit of the first electronic device with the first manner, a conventional technical problem that the first electronic device cannot identify, when transmitting information to the second electronic device, the second electronic device as an electronic device with a demand for acquiring information. Therefore, when the first electronic device transmits information to the second electronic device, the first electronic device identifies, based on the second state parameter of the second electronic device, the second electronic device as the electronic device with the demand for acquiring information, and thus the efficiency of the information transmission may be improved.

2. According to the embodiments of the disclosure, the second state parameter of the second electronic device may be the relative position relationship between the second electronic device and the first electronic device, and particularly, may be the relative distance between the second electronic device and the first electronic device or the relative angle of the second electronic device with respect to the first electronic device. Hence, the first electronic device may identify, in a variety of ways, the second electronic device as the electronic device with the demand for acquiring information, and thus the efficiency of the information transmission may be improved.

3. According to the embodiments of the disclosure, since the second state parameter of the second electronic device may the relative position relationship between the second electronic device and the first electronic device, and particularly, may be the relative distance between the second electronic device and the first electronic device, and the relative angle of the second electronic device with respect to the first electronic device. If there are at least two second electronic devices, the relative positions of the second icons with respect to the first icon may be determined based on the relative distances and the relative angles, and then the display unit of the first electronic device is controlled to display, in the first interface, the second icons at the respective relative positions with respect to the first icon. The first icon is for representing the first electronic device, and the second icons are for representing the second electronic devices.

Therefore, if there are at least two second electronic devices, the first electronic device may distinguish among the second electronic devices based on the relative positions of the second electronic devices with respect to the first electronic device.

4. According to the embodiments of the disclosure, the second state parameter of the second electronic device may be the motion state of the second electronic device. The motion display mode corresponding to the motion state is determined based on the motion state. The display unit of the first electronic device is controlled to display the second icon in the first interface with the motion display mode. The second icon is for representing the second electronic device. Therefore, the first electronic device may determine, based on the motion state of the second electronic device, the second electronic device as the electronic device with the demand for acquiring information, and thus the efficiency of the information transmission may be improved.

It is to be understood by those skilled in the art that the embodiments of the disclosure may be provided as a method, a system or a computer program product. Therefore, the disclosure may be implemented in a form of hardware, software or a combination of hardware and software. Furthermore, the disclosure may be implemented in a form of a computer program product executed on one or multiple computer available storage media (e.g., a magnetic disk storage, a CD-ROM, an optical storage) including computer available program codes.

The disclosure is described in conjunction with flowcharts or block diagrams of a method, a device (a system) and a computer program product according the embodiments of the disclosure. It is to be understood that each step of the flowcharts, or each block of the block diagrams, or any combination of the steps or the blocks may be achieved through computer program instructions. The computer program instructions may be provided to a processor of a general-purpose computer, an application specific computer, an embodied processing machine or other programmable data processing devices, and then the instructions, when executed by the processor of the computer or other programmable data processing devices, may generate a device for implementing a function specified in one or multiple steps of the flowcharts or in one or multiple blocks of the block diagrams.

The computer program instructions may be stored in a computer readable storage which may boot the computer or other programmable data processing devices to work in a specified manner, allowing the instructions stored in the computer readable storage to generate a product including an instruction device which may achieve a function specified in one or multiple steps of the flowcharts or in one or multiple blocks of the block diagrams.

The computer program instructions may be loaded to the computer or other programmable data processing devices. A series of operation steps may be performed on the computer or other programmable processing devices to generate computer-achieved processing. Therefore, the instructions, when performed on the computer or other programmable devices, may provide a step for achieving a function specified in one or multiple steps of the flowcharts or in one or multiple blocks of the block diagrams.

The computer program instructions corresponding to the information processing method according to the embodiment of the disclosure may be stored in a storage medium such as an optical disk, a hard driver or a U disk. When the computer program instructions corresponding to the information processing method stored in the storage medium are read or executed by an electronic device, the following steps are performed:

triggering the communication unit to perform a detection;

acquiring a second state parameter of a second electronic device, in the case that the communication unit detects that a device distance between the first electronic device and the second electronic device meets a preset condition; and controlling the display unit to display a second icon in a first interface with a first manner, where the second icon is for representing the second electronic device, and the first manner is determined based on the second state parameter.

Optionally, when the computer instruction stored in the storage medium corresponding to the step of acquiring the second state parameter of the second electronic device is executed, the following step is performed:

acquiring a relative position relationship between the second electronic device and the first electronic device Optionally, when the computer instruction stored in the storage medium corresponding to the step of acquiring the relative position relationship between the second electronic device and the first electronic device is executed, the following step is performed:

acquiring at least one of a relative distance between the second electronic device and the first electronic device, and a relative angle of the second electronic device with respect to the first electronic device.

Optionally, additional computer instructions are stored in the storage medium. When the computer instruction corresponding to the step of controlling the display unit to display the second icon in the first interface with the first manner is executed, the additional computer instructions are executed. The process in which the additional instructions are executed may include:

controlling the display unit to display a first icon representing the first electronic device in the first interface.

Optionally, in the case that the relative position relationship is the relative distance and the first icon is displayed in the first interface, the process in which the computer instruction stored in the storage medium corresponding to controlling the display unit to display the second icon in the first interface with the first manner is executed, may include:

determining a relative icon distance between the second icon and the first icon based on the relative distance; and controlling the display unit to display, in the first interface, the second icon at any position of the circumference of a circle, where the relative icon distance is taken as the radius of the circle and the first icon is taken as the center of the circle.

Optionally, in the case that the relative position relationship is the relative angle and the first icon is displayed in the first interface, the process in which the computer instruction stored in the storage medium corresponding to the step of controlling the display unit to display the second icon in the first interface with the first manner is executed, may include:

determining a relative icon angle of the second icon with respect to the first icon based on the relative angle; and controlling the display unit to display, in the first interface, the second icon at the relative icon angle with respect to the first icon.

Optionally, in the case that there are at least two second electronic devices, the relative position relationship includes the relative distance and the relative angle, and the first icon is displayed in the first interface, the process in which the computer instruction stored in the storage medium corresponding to the step of controlling the display unit to display the second icon in the first interface with the first manner is executed, may include:

determining relative positions of the respective second icons from the first icon based on the relative distances and the relative angles; and controlling the display unit to display, in the first interface, the second icons at the respective relative positions with respect to the first icon.

Optionally, the process in which the computer instruction stored in the storage medium corresponding to the step of acquiring the second state parameter of the second electronic device is executed, may include:

acquiring a motion state of the second electronic device through the detection of the communication unit.

Optionally, in the case that the second state parameter is the motion state, the process in which the computer instruction stored in the storage medium corresponding to the step of controlling the display unit to display the second icon in the first interface with the first manner is executed, may include:

determining a motion display mode corresponding to the motion state based on the motion state; and controlling the display unit to display the second icon in the first interface with the motion display mode.

Optionally, the process in which the computer instruction stored in the storage medium corresponding to the step of determining the motion display mode corresponding to the motion state based on the motion state is executed, may include:

determining a first motion display mode corresponding to a first motion state as the motion display mode, if the communication unit detects that the motion state of the second electronic device is the first motion state; and determining that the motion display mode is switched from the first motion display mode to a second motion display mode corresponding to a second motion state, if the communication unit detects that the motion state of the second electronic device is switched from the first motion state to the second motion state.

Although the preferred embodiments of the disclosure are described, other changes and modifications to these embodiments may be made by those skilled in the art upon knowing the basic conceptions of the disclosure. Therefore, the appended claims are intended to cover the preferred embodiments as well as all the changes and modifications falling within the scope of the disclosure.

Apparently, various modifications and variations to the disclosure may be made by the skilled in the art without departing from the spirit and scope of the disclosure. In this way, when those modifications and variations to the disclosure belong to the scope of the appended claims and the equivalent thereof, the disclosure is intended to cover the modifications and the variations.

The invention claimed is:

1. An information processing method, comprising:
   triggering a communication unit of a first electronic device to perform a detection;
   acquiring a shake state of a second electronic device through the detection of the communication unit, a relative distance between the second electronic device and the first electronic device and a relative angle of the second electronic device with respect to the first electronic device, if the communication unit detects that the relative distance between the first electronic device and the second electronic device meets a preset condition;
   determining a shake display mode corresponding to the shake state based on the shake state, a relative icon distance between a second icon and a first icon based on the relative distance and a relative icon angle of the second icon with respect to the first icon based on the relative angle, wherein the first icon is for representing the first electronic device, the second icon is for representing the second electronic device;
   controlling a display unit of the first electronic device to display the first icon in a first interface, and the second icon at the relative icon angle with respect to the first icon in the first interface with the shake display mode corresponding to the shake state of the second electronic device, wherein the relative icon distance between the first icon and the second icon is proportional to the relative distance between the first electronic device and the second electronic device; and
   determining the second electronic device is an electronic device that requires communication based on the shake display mode of the second icon;
   wherein the method further comprises:
      determining that the shake display mode is switched from the shake display mode to a static display mode corresponding to a static state, if the communication unit detects that the shake state of the second electronic device is switched from the shake state to the static state; and
      controlling the display unit of the first electronic device to display the second icon in the first interface with the static display mode, wherein the second icon is for representing the second electronic device, and the static display mode is determined based on the static state;
   wherein there are at least two second electronic devices, the controlling the display unit of the first electronic device to display the second icon comprises,
   determining relative positions of the respective second icons with respect to the first icon based on the relative distances and the relative angles;
   controlling the display unit to display, in the first interface, the second icons at the respective relative positions with respect to the first icon; and
   distinguishing, by the first electronic device, among the second electronic devices based on the relative positions of the second electronic devices with respect to the first electronic device.

2. The method according to claim 1, wherein the controlling the display unit of the first electronic device to display the second icon in the first interface comprises:
   controlling the display unit to display, in the first interface, the second icon at a circumference of a circle, wherein the relative icon distance is taken as a radius of the circle and the first icon is taken as a center of the circle.

3. A first electronic device comprising a processor and a memory storing instructions, wherein the instructions, when executed by the processor, configure the first electronic device to:
   trigger a communication unit to perform a detection;
   acquire a shake state of a second electronic device through the detection of the communication unit, a relative distance between the second electronic device and the first electronic device and a relative angle of the second electronic device with respect to the first electronic device, if the communication unit detects that the relative distance between the second electronic device and the first electronic device meets a preset condition;
   determine a shake display mode corresponding to the shake state based on the shake state, a relative icon distance between a second icon and a first icon based on the relative distance and a relative icon angle of the second icon with respect to the first icon based on the relative angle, wherein the first icon is for representing the first electronic device, the second icon is for representing the second electronic device;
   control a display unit to display the first icon in a first interface, and the second icon at the relative icon angle with respect to the first icon in the first interface with the shake display mode corresponding to the shake state of the second electronic device, wherein the relative icon distance between the first icon and the second icon is proportional to the relative distance between the first electronic device and the second electronic device; and
   determine the second electronic device is an electronic device that requires communication based on the shake display mode of the second icon;
   wherein the instructions, when executed by the processor, further configure the first electronic device to:
      determine that the shake display mode is switched from the shake display mode to a static display mode corresponding to a static state, if the communication unit detects that the shake state of the second electronic device is switched from the shake state to the static state; and
      control the display unit of the first electronic device to display the second icon in the first interface with the static display mode, wherein the second icon is for representing the second electronic device, and the static display mode is determined based on the static state;
   wherein the instructions, when executed by the processor, configure the first electronic device to:
   determine relative positions of the respective second icons from the first icon based on the relative distances and the relative angles;
   control the display unit to display, in the first interface, the second icons at the respective relative positions with respect to the first icon; and
   distinguish among the second electronic devices based on the relative positions of the second electronic devices with respect to the first electronic device.

4. The first electronic device according to claim 3, wherein the instructions, when executed by the processor, configure the first electronic device to:
   control the display unit to display, in the first interface, the second icon at a circumference of a circle, wherein the relative icon distance is taken as a radius of the circle and the first icon is taken as a center of the circle.

\* \* \* \* \*